US008205643B2

(12) United States Patent
Lee et al.

(10) Patent No.: US 8,205,643 B2
(45) Date of Patent: Jun. 26, 2012

(54) MULTI-TUBULAR FLUID TRANSFER CONDUIT

(75) Inventors: Fei Philip Lee, Holland, MI (US); Ralph J. Worthington, Holland, MI (US)

(73) Assignee: Woodward, Inc., Fort Collins, CO (US)

( * ) Notice: Subject to any disclaimer, the term of this patent is extended or adjusted under 35 U.S.C. 154(b) by 864 days.

(21) Appl. No.: 12/252,776

(22) Filed: Oct. 16, 2008

(65) Prior Publication Data
US 2010/0096037 A1 Apr. 22, 2010

(51) Int. Cl.
*F16L 11/00* (2006.01)
*A62C 5/02* (2006.01)

(52) U.S. Cl. ........ 138/114; 138/177; 138/178; 138/109; 239/8

(58) Field of Classification Search .................. 138/114, 138/109, 148; 285/123.1, 189, 589
See application file for complete search history.

(56) References Cited

U.S. PATENT DOCUMENTS

| 4,624,485 | A | | 11/1986 | McStravick et al. | |
|---|---|---|---|---|---|
| 5,076,242 | A | * | 12/1991 | Parker | 123/514 |
| 5,239,964 | A | * | 8/1993 | Diener et al. | 123/456 |
| 5,611,373 | A | * | 3/1997 | Ashcraft | 138/113 |
| 6,009,908 | A | * | 1/2000 | Hartnagel et al. | 138/113 |
| 6,131,615 | A | * | 10/2000 | Hartnagel et al. | 138/113 |
| 6,145,545 | A | * | 11/2000 | Hartnagel et al. | 138/113 |
| 6,149,075 | A | | 11/2000 | Moertle et al. | |
| 6,270,024 | B1 | | 8/2001 | Popp | |
| 6,425,532 | B1 | | 7/2002 | Popp | |
| 6,565,126 | B1 | * | 5/2003 | Julien et al. | 285/122.1 |
| 6,877,306 | B2 | | 4/2005 | Wernberg et al. | |
| 7,025,126 | B1 | * | 4/2006 | Wyatt et al. | 165/154 |
| 7,114,336 | B2 | | 10/2006 | Hommema | |
| 7,521,035 | B1 | * | 4/2009 | Grob et al. | 423/512.1 |
| 2001/0030248 | A1 | | 10/2001 | Popp | |
| 2002/0157719 | A1 | * | 10/2002 | Ikegawa | 138/114 |
| 2003/0217779 | A1 | * | 11/2003 | Schippl | 138/148 |
| 2007/0283931 | A1 | | 12/2007 | Mao | |

FOREIGN PATENT DOCUMENTS

| EP | 1 793 169 A2 | 6/2007 |
|---|---|---|
| JP | 50-142214 U | 11/1975 |
| JP | 05-052496 U | 7/1993 |
| KR | 10-0212955 B1 | 8/1999 |

OTHER PUBLICATIONS

U.S. Appl. No. 12/194,597, filed Aug. 20, 2008, Smith.
U.S. Appl. No. 12/233,671, filed Sep. 19, 2008, Lee et al.
U.S. Appl. No. 12/233,697, filed Sep. 19, 2008, Hicks et al.

* cited by examiner

*Primary Examiner* — Patrick F Brinson
(74) *Attorney, Agent, or Firm* — Reinhart Boerner Van Deuren P.C.

(57) ABSTRACT

A fluid transfer system having improved stress accommodation properties and thermal insulation properties is provided. The fluid transfer system includes a fluid transfer conduit comprising a plurality of concentric tubes configured to divide and distribute an axial stress induced in the fluid transfer conduit to each of the tubes and a vacuum cavity between the fluid transfer conduit and a structural support of the fluid transfer system to insulate fluid from a surrounding environment.

29 Claims, 14 Drawing Sheets

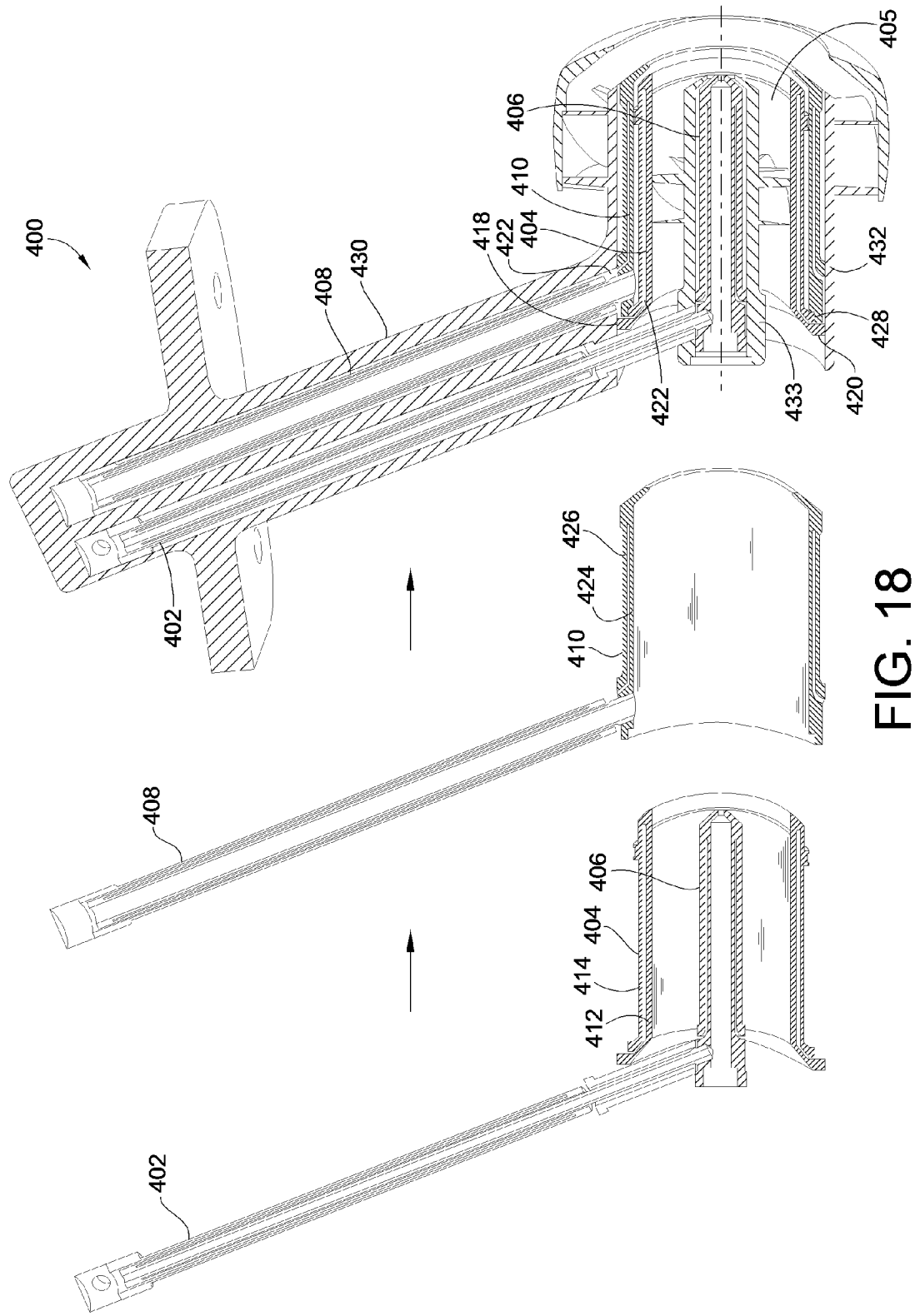

MULTI-TUBULAR FLUID TRANSFER CONDUIT

FIELD OF THE INVENTION

This invention generally relates to a fluid transfer device, more particularly a fluid transfer conduit configured for efficient thermal insulation and to accommodate structural stresses.

BACKGROUND OF THE INVENTION

Frequently, a fluid transfer device, such as a tubular conduit, is subjected to mechanical stresses such as thermal expansion due to external forces. In a tubular conduit structure, pulling along the tube axis at the ends of the tubular conduit that results from thermal expansion causes tensile stresses in the conduit structure, while pushing causes compressive stresses. Often an excessive amount of such stresses leads to a structural failure of the conduit. Further, in some applications, heat transfer between fluid flowing through the conduit and the surrounding environment can be problematic. For example, insulating a steam pipe to reduce heat loss of steam as it flows through the conduit has been a challenge.

A fluid transfer conduit is also utilized in fuel nozzles for conventional gas turbine engine systems. Often fuel systems for regulating a flow of fuel to a combustion chamber of gas turbine engines include one or more fuel nozzles arranged in the combustion chamber, a fuel pump for pressurizing fuel from a fuel supply, a fuel metering unit for controlling the flow of fuel to the fuel nozzles, and one or more fuel manifolds fluidically connecting the fuel metering unit to the fuel nozzles. During engine start-up, fuel is pumped from the fuel supply to the fuel metering unit by the fuel pump and, once a sufficient start-up pressure is attained, a pressurizing valve of the fuel metering unit opens and fuel is supplied to the fuel nozzles via the fuel manifold. In the fuel nozzles, fuel is transferred through a fuel transfer conduit and injected into the combustion chamber.

Due to severe operating conditions within gas turbine engines, the engine's fuel nozzles are required to satisfy numerous design challenges. One such challenge posed by severe external pressures and temperatures of hot compressor discharge air surrounding the exterior of the fuel nozzle is accommodation of large thermally induced deformations within the body of the fuel nozzle. Unfortunately, a conventional fuel transfer conduit of the fuel nozzle comprising a single tube can experience a high thermal stress in such severe operating conditions, which results in structural failures.

Another challenge is thermally shielding fuel from the severe external temperatures. It is desirable to deliver fuel at a much lower temperature than the surrounding hot compressor air during turbine engine operations. If too much heat is transferred to fuel, fuel can begin to coke, thereby ruining or reducing the quality and delivery of fuel. Thus, conventional fuel nozzle designs utilize various insulating schemes to reduce the amount of heat that can be transferred from the high-temperature compressor air to fuel passing through the fuel nozzle. For example, a gap between the fuel transfer conduit and the fuel nozzle support is filled with an air-fuel-coke mixture, which has a lower thermal conductivity than a constituent metal of the fuel nozzle support, thereby shielding fuel from the environment external to the fuel nozzle support. However, the evolution of the gas turbine engines has been such that temperature and pressure of the compressor discharge air have substantially risen, and thus, the thermal shielding of fuel has become even more of a design challenge.

For many applications, it has been found that the conventional single insulating fuel gap filled with the air-fuel-coke mixture does not provide enough thermal protection to fuel that the engine manufacturers require.

In view of these challenges, there is a need in the art for an improved fluid transfer device. The present invention pertains to such improvements to the state of the art of a fluid transfer conduit which can better accommodate external stresses and insulate fluid from external environments.

BRIEF SUMMARY OF THE INVENTION

In view of the above, embodiments of the present invention provide a new and improved fluid transfer conduit that overcomes one or more of the challenges existing in the art. More particularly, embodiments of the present invention provide a new and improved fluid transfer conduit including multiple nested concentric tubes that has better thermal insulation properties and can better accommodate structural stresses than conventional single tube fluid transfer devices.

In one aspect, an embodiment of the invention provides a fluid transfer conduit including multiple concentric tubes nested about an axis. Each of the concentric tubes has an upstream end and a down end, wherein each of the concentric tubes is joined with an adjacent tube at one of the upstream or downstream ends, wherein a fluid passageway is formed.

In another aspect, an embodiment of the invention provides a fuel nozzle including a fuel nozzle support having a nozzle stem structure and a nozzle head structure, and a fuel transfer conduit. The fuel transfer conduit includes multiple concentric tubes nested about an axis, wherein each of the concentric tubes has an upstream end and a downstream end. Each of the concentric tubes is joined with an adjacent tube at one of the upstream or downstream ends, wherein a fluid passageway is formed. The fuel transfer conduit is arranged within the fuel nozzle support and attached to an inner surface of the fuel nozzle support.

In yet another aspect, an embodiment of the invention provides a pipe joint assembly including a first pipe, a second pipe, and a fluid transfer conduit joining the first pipe and the second pipe. The fluid transfer conduit includes multiple concentric tubes nested about an axis, wherein each of the concentric tubes has an upstream end and a downstream end. Each of the concentric tubes is joined with an adjacent tube at one of the upstream or downstream ends, wherein a fluid passageway is formed.

In another aspect, an embodiment of the invention provides a method of reducing an axial stress induced on a fluid transfer conduit including forming a fluid transfer conduit and joining the fluid transfer conduit to a fluid transfer system. The fluid transfer conduit is formed to include multiple concentric tubes nested about an axis, wherein each of the concentric tubes has an upstream end and a downstream end. Each of the concentric tubes is joined with an adjacent tube at one of the upstream or downstream ends, wherein a fluid passageway is formed. The fluid transfer conduit is formed to further include a first connector and a second connector on opposite ends of the fluid transfer conduit, wherein the first connector and the second connector are attached to a structural support of the fluid transfer system.

In yet another aspect, an embodiment of the invention provides a method of improving thermal insulation of a fluid transfer system including forming a fluid transfer conduit having multiple concentric tubes, arranging the fluid transfer conduit within the fluid transfer system, forming a vacuum cavity between the multiple concentric tubes and an inner surface of the fluid transfer system, wherein the vacuum cavity provides thermal insulation between a fluid in the fluid transfer conduit and an environment external to the fluid transfer system. The fluid transfer conduit is formed to include multiple concentric tubes nested about an axis, wherein each of the concentric tubes has an upstream end and a downstream end. Each of the concentric tubes is joined with an adjacent tube at one of the upstream or downstream ends, wherein a fluid passageway is formed. The fluid transfer conduit is formed to further include a first connector and a second connector on opposite ends of the fluid transfer conduit wherein the first connector and the second connector are attached to a structural of the fluid transfer system.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 18 is a cross sectional view of a fuel nozzle comprising five fuel transfer conduits, wherein one of the five fuel transfer conduit also functions as an airflow conduit according to an embodiment of the present invention While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
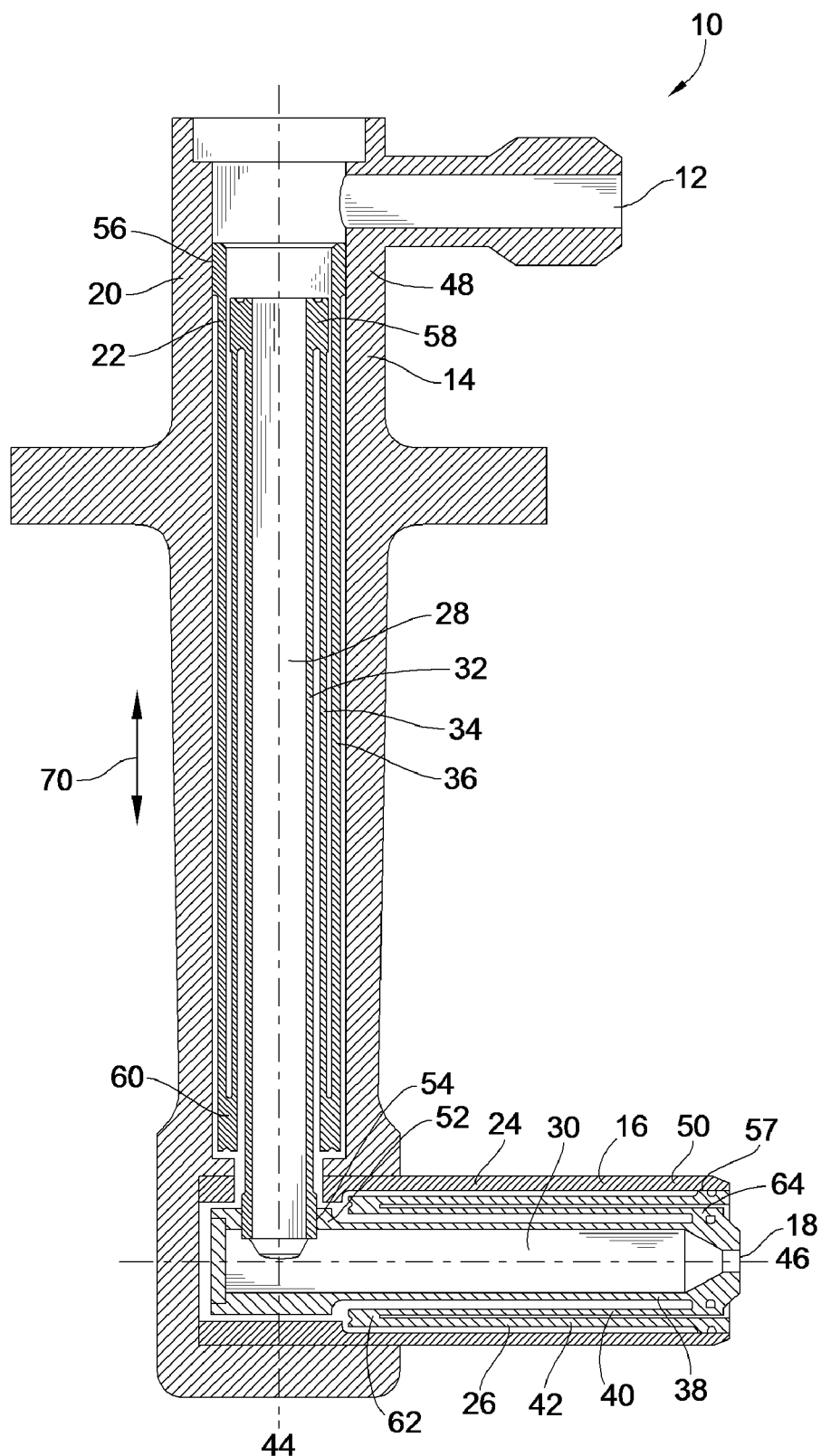
FIG. 1 is a cross sectional view of a fuel nozzle including two fuel transfer conduits, each comprising three concentric tubes according to an embodiment of the present invention.

FIG. 1 shows a cross sectional view of a fuel nozzle 10 including a fuel transfer conduit 22 according to an embodiment of the present invention. The fuel nozzle 10 can be implemented in a gas turbine system to inject fuel into a combustion chamber, wherein fuel is mixed with air and burned at high temperatures while maintaining a near static pressure. The gas temperature required in a turbine varies according to engine speed, so the combustion chamber must be capable of a stable and efficient combustion over a wide range of operating conditions that can be maintained for extended periods. The temperature of air leaving a primary combustion zone can be approximately 1800° C. and 2000° C. The fuel nozzle 10 includes an improved fuel transfer conduit 22, which can better accommodate thermally induced structural stresses and better shield fuel from the severe temperatures of the gas turbine system.

Although the fuel transfer conduit 22 in this embodiment is used in the fuel nozzle 10 of a gas turbine engine, the fuel transfer conduit 22 may also be implemented in other fluid transfer systems to transfer fluid. The term fluid in this application generally refers to a type of physical substance that does not have a bulk self structure to support a well defined form or shape in a free space. Thus, fluid may only be contained, transported, transferred, or conveyed with a container, duct, pipe, or conduit. Fluid moves via mechanisms of pressure, diffusion, density concentrations, gravity, and other potential forces such as electric and magnetic fields. Examples of fluid include, but not limited to, liquids, gases, steam, slurries, fluidized solids, and mixtures thereof.

As shown in FIG. 1, the fuel nozzle 10 includes a fuel inlet 12, an injector stem 14, an injector head 16 and a fuel outlet 18. The injector stem 14 includes a support structure 20 and a fuel transfer conduit 22. Similarly, the injector head 16 includes a support structure 24 and a fuel transfer conduit 26. In the fuel nozzle 10, fuel enters through the fuel inlet 12 and flows through the injector stem 14 via an axial flow path 28 defined by the fuel transfer conduit 22. Fuel then flows radially through a radial flow path 30 defined by the fuel transfer conduit 26 and exits the fuel nozzle 10 via the fuel outlet 18.

The fuel transfer conduit 22 includes a plurality of concentric tubes 32, 34, 36 nested concentrically about an axis 44.

Similarly, the fuel transfer conduit 26 includes a plurality of concentric tubes 38, 40, 42 arranged about an axis 46. In this embodiment, each of the fuel transfer conduits 22 and 26 includes three layers of concentric tubes, however, other embodiments may include two concentric tubes or more than three concentric tubes.

As shown in FIG. 1, three concentric tubes 32, 34, 36 are joined at their ends in a sequential manner, forming the fuel transfer conduit 22. Similarly, three concentric tubes 38, 40, 42 are joined at their ends in a sequential manner to form the fuel transfer conduit 26. The fuel transfer conduit 22 and the fuel transfer conduit 26 are joined at a connector 54, wherein the inner tube 32 of the fuel transfer conduit 22 is attached to the inner tube 38 of the fuel transfer conduit 26 by a suitable process such as, e.g., brazing. The outer tube 36 of the fuel transfer conduit 22 is arranged adjacent to the nozzle stem support structure 20 and attached to an inlet side 48 of the support structure 20 at an inlet side connector 56. The middle tube 34 is arranged concentrically between the inner tube 32 and outer tube 36. One end of the middle tube 34 is joined with the inner tube 32 at a joint 58, proximate the inlet side connector 56. The other end of middle tube 34 is joined with the outer tube 36 at a joint 60, proximate the connector 54. The joints 58 and 60 are floating joints, unattached to the support structure 20 or to the fuel transfer conduit 26. Similarly, the outer tube 42 of the fuel transfer conduit 26 is attached to an outlet side 50 of the injector head support structure 24 at an outlet side connector 57. Further, the outer tube 42 and middle tube 40 are joined at a joint 62, while the middle tube 40 and the inner tube 38 are joined at a joint 64. The joints 62 and 64 are also floating joints.

Figure 2:
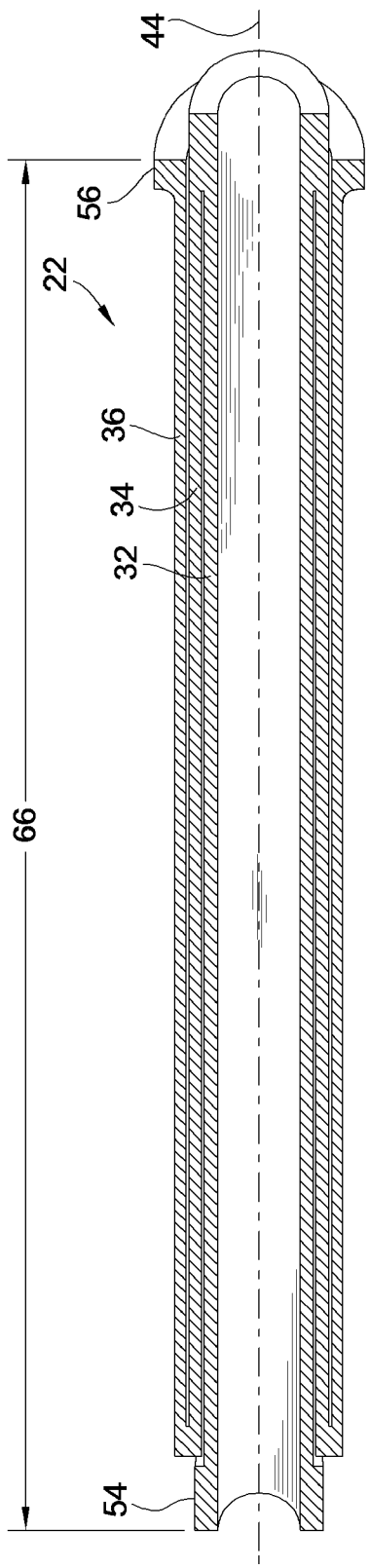
FIG. 2 is a cross sectional detail view of the fuel transfer conduit of FIG. 1 before expansion.
Figure 3:
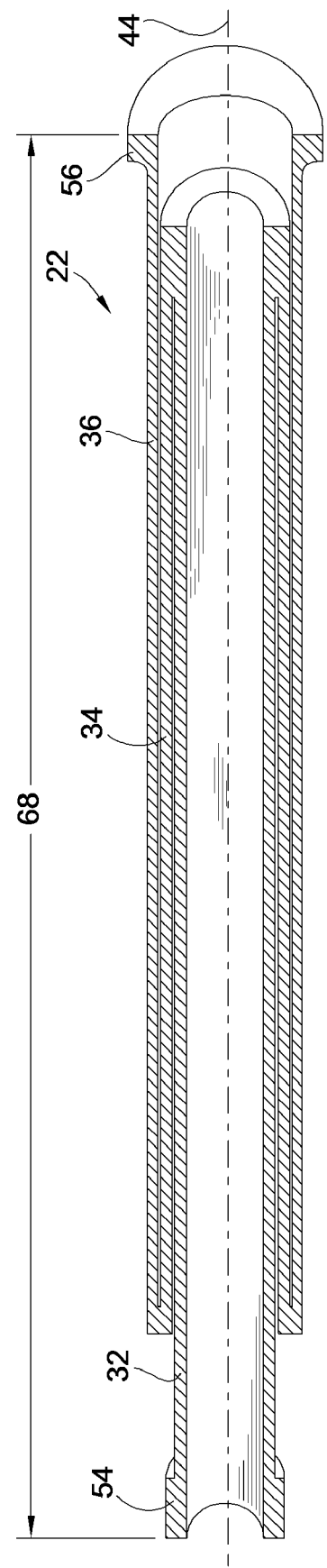
FIG. 3 is a cross sectional detail view of the fuel transfer conduit of FIG. 2 after expansion.

FIGS. 2-3 illustrate the fuel transfer conduit 22 in cross sectional detail views. The fuel transfer conduit 22 including the tubes 32, 34, 36 is unexpanded in FIG. 2. A displacement 66 of the fuel transfer conduit 22 is defined between the end of the tube 36 at the inlet side connector 56 and the end of the tube 32 at the connector 54. FIG. 3 illustrates the fuel transfer conduit 22 of FIG. 2 subjected to a thermal expansion. In high temperature operating conditions, the support structure 20 (FIG. 1) formed of a suitable metallic material can experience a thermal expansion, wherein the thermal expansion of the support structure 20 can act on the fuel transfer conduit 22 as a pulling force via the inlet side connector 56.

For example, in one embodiment, the displacement 66 as shown in FIG. 2 may be 10 inches in length. In this embodiment, a cross sectional area of each of the tubes 32, 34, 36 are approximately equal, wherein the stiffness of the tubes 32, 34, 36 are also approximately equal to distribute the load equally along each of the tube 32, 34, 36s. In such embodiment, the fuel transfer conduit 22 is configured so that the outer tube 36 has a smallest tube wall thickness and the inner tube 32 has a largest tube wall thickness to provide for the approximately equal tube cross sectional area of the tubes 32, 34, 36. As the operating temperature rises, the support structure 20 can expand axially 70 (FIG. 1). When the support structure 20 expands axially, the inlet side connector 56, which is attached to the support structure 20 pulls the tube 36 axially along the axis 44 of FIG. 2, thereby increasing the displacement 66 of FIG. 2 to a displacement 68 in FIG. 3. For simplicity of the discussion, it is assumed that the displacement 68 is 13 inches.

In this embodiment, such thermal expansion of the support structure 20 can be accommodated with a substantially reduced structural stress to the fuel transfer conduit 22. That is, when the fuel transfer conduit 22 is subjected to the pulling force due to the axial thermal expansion 70 (FIG. 1) of the support structure 20, the fuel transfer conduit 22 formed of the three concentric tubes 32, 34, 36 extends in a telescoping like manner, wherein the tubes 32 and 36 expand and slide against the tube 34 that compresses, as shown in FIG. 3. As the displacement of the fuel transfer conduit 22 increases by 3 inches, each of the outer tube 36 and the inner tube 32 is stretched by 1 inch, while the middle tube 34 is compressed by 1 inch. Such spreading of the stress into the plurality of tubes can substantially improve the maximum structural stress that the transfer conduit 22 can accommodate when compared to a conventional single tube fuel transfer conduit (in the same example, the single tube will be subjected to a 3 inches stretch.)

Although the accommodation of stress is explained in the context of a thermal expansion in this embodiment, the fuel transfer conduit 22 can also accommodate for compression stress in a similar manner. When the fuel transfer conduit 22 is subjected to a compression stress, wherein each end of the fuel transfer conduit 22 is pushed axially toward the center, the inner tube 32 and the outer tube 36 will compress and the middle tube 34 will expand to spread the compression stress among three tubes 32, 34, 36.

Therefore, a fluid transfer conduit including a plurality of tubes assembled in a concentric series manner, according to embodiments of the present invention, substantially improves its axial compliance and reduces axial structural stress by a factor of the number of concentric tubes in the conduit assembly.

Compliance of conduit assembly≈Compliance of single tube conduit×number of concentric tubes in conduit assembly    (1)

For example and as discussed above, an axial load applied to ends of the fluid transfer conduit including three concentric tubes that changes a displacement of the fluid transfer conduit by X is accommodated by each of the three tubes, wherein each of the three tubes is expanded or compressed by X/3 to conform to the total change in displacement, X. Similarly, in a fluid transfer conduit including five concentric tubes, the stress resulting is the change in displacement of X is accommodated by each tube, wherein each of the five tubes expands or contracts by X/5 to conform to the total change of displacement, X. Therefore, a stress induced in a fluid transfer conduit including a plurality of tubes by a fixed amount of axial displacement at its connectors is reduced in comparison to a conventional fluid conduit including a single tube:

Stress in the conduit assembly≈Stress of a single tube conduit/number of concentric tubes in the conduit assembly    (2)

The stress induced in a fluid transfer conduit can further be minimized through a selection of material for the fluid transfer conduit. For example, when a fluid transfer conduit is implemented in a system, wherein a temperature of fluid flowing through the fluid transfer conduit is significantly different from a temperature of the surrounding environment, such as in the turbine engine fuel nozzle applications, temperature differences among each of the plurality of tubes of the fluid transfer conduit can result from the heat transfer in or out of the fluid transfer conduit. In such an embodiment a selection of material for each of the tubes to attain an optimal combination of thermal expansion coefficient in the fluid transfer conduit can minimize a stress induced in the fuel transfer conduit. In an embodiment wherein fluid flowing through the fluid transfer conduit including three tubes has a lower temperature than the surrounding environment, such as fuel flowing through a fuel nozzle in turbine engines, the outer tube and the inner tube can be formed of a material having a higher thermal expansion coefficient, while the middle tube can be formed of a material having a lower thermal expansion coefficient. On the other hand, if fluid flowing through the three-tube fluid transfer conduit has a higher temperature than the surrounding environment, such as hot steam in a steam pipe, the inner tube and the outer tube of the fluid transfer conduit are preferably formed of a material having a lower thermal expansion coefficient, while the middle tube is formed of a material having a higher thermal expansion coefficient.

Figure 4:
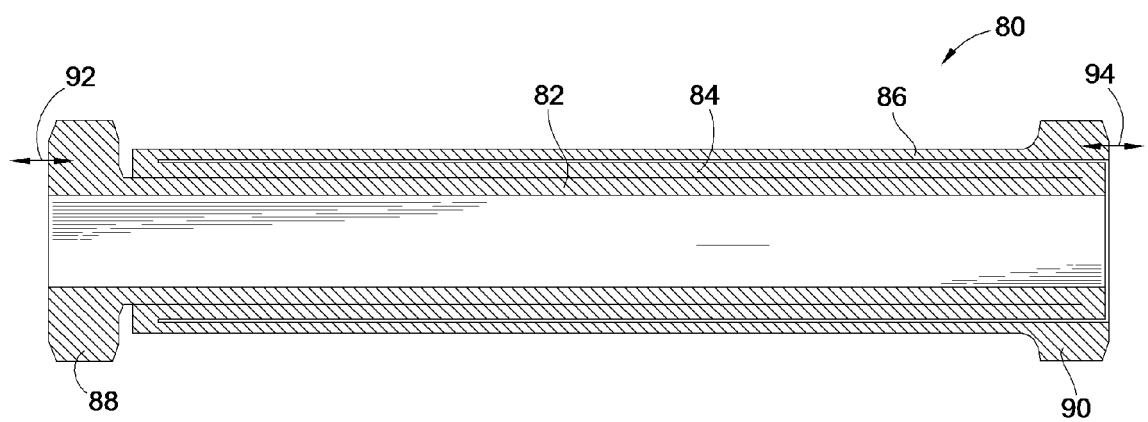
FIG. 4 is a schematic cross sectional view of a fluid transfer conduit comprising three concentric tubes according to a different embodiment of the present invention.

FIG. 4 is a schematic cross sectional view of a fluid transfer conduit 80 according to a different embodiment of the present invention. The fluid transfer conduit 80 is similar to the fuel transfer conduit 22, and includes an inner tube 82, a middle tube 84, an outer tube 86 and connectors 88 and 90. In this embodiment, both of the connectors 88, 90 of the fluid transfer conduit 80 can be attached to a support structure of a fluid transfer system, such as a steam pipe 96 in FIG. 15, and subjected to an external force 92, 94 on each end. When the fluid transfer conduit 80 is exposed to a tensile load, wherein the connectors 88 and 90 are pulled apart, the fluid transfer conduit 80 extends by expanding the inner tube 82 and the outer tube 86 and compressing the middle tube 84, thereby spreading the tensile load into three tubes 82, 84, 86. Similarly, when the fluid transfer conduit 80 is exposed to a compression load, the inner tube 82 and the outer tube 86 compress, while the middle tube 84 expands to spread the compression load over the three tubes 82, 84, 86.

Figure 15:
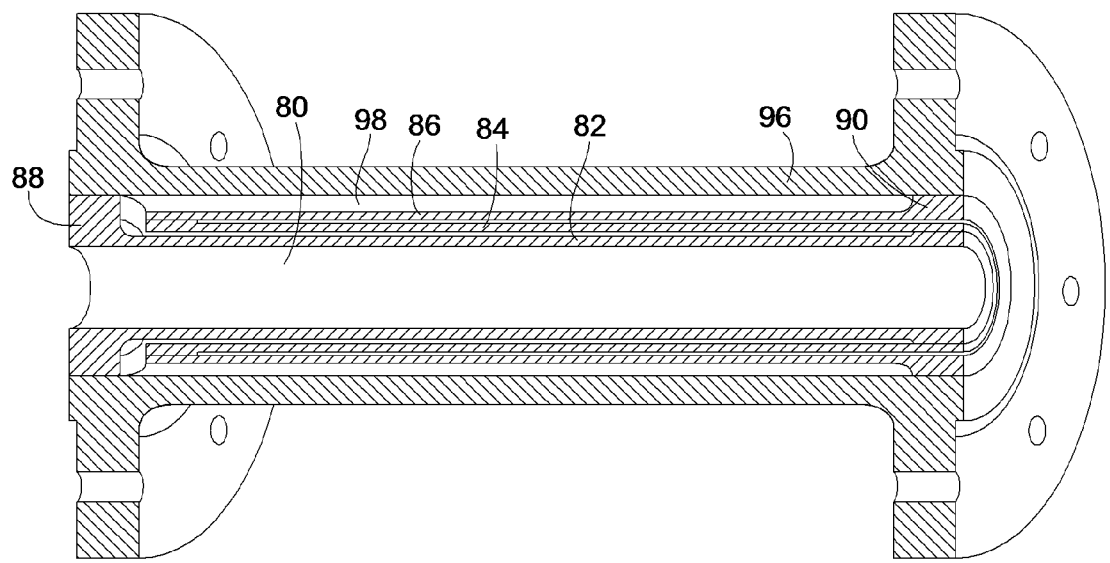
FIG. 15 is a cross sectional view of the fluid transfer conduit of FIG. 4 attached within a steam pipe.

FIG. 15 illustrates the steam pipe 96 employing the fluid transfer conduit 80 of FIG. 4. In this embodiment, the fluid transfer conduit 80 functions as a thermal insulation to reduce heat loss from steam to the ambient environment through a wall of the steam pipe 96. The connectors 88, 90 of the fluid transfer conduit 80 are attached to an inner surface of the steam pipe 96 using a suitable process such as welding, brazing, adhesive bonding, etc. Preferably, the fluid transfer conduit 80 and the steam pipe 96 are attached via vacuum brazing to form a vacuum cavity 98 between the inner surface of the steam pipe 96 and the outer tube 86, wherein the vacuum cavity 98 continues through a space between the middle tube 84 and the inner tube 82. The vacuum cavity 98, being depleted of thermally conducting substances or molecules, provides a superior thermal insulation when compared to conventional insulations. The plurality of tubes 82, 84, 86 of the fluid transfer conduit also serves as multiple radiation shields, thereby further reducing the heat loss of steam.

During operation, the fluid transfer conduit 80 becomes hotter than the steam pipe 96 from being in a direct contact with hot steam. However, thermal expansion of the inner tube 82 and the outer tube 86 is constrained because these tubes are attached to the inner surface of the steam pipe 96 at connectors 88, 90. That is, the tubes 82, 84, 86 of the fluid transfer conduit 80, which are hotter than the steam pipe 96, tend to expand their length relative to the colder steam pipe 96, but the tubes 82 and 86 are constrained by the connectors 88, 90 fixed to the inner surface of the steam pipe 96. Therefore, an axial compressive stress is induced in the inner tube 82 and the outer tube 86, whereas the middle tube 84, which is joined with the outer tube 86 at one end and the inner tube 82 at the other end, is pulled by the stress induced in the inner tube 82 and the outer tube 88, thereby subjected to an axial tensile stress. As a result, the thermal expansion of the fluid transfer conduit 80 is accommodated by the all three tubes 82, 84, 86.

Figure 16:
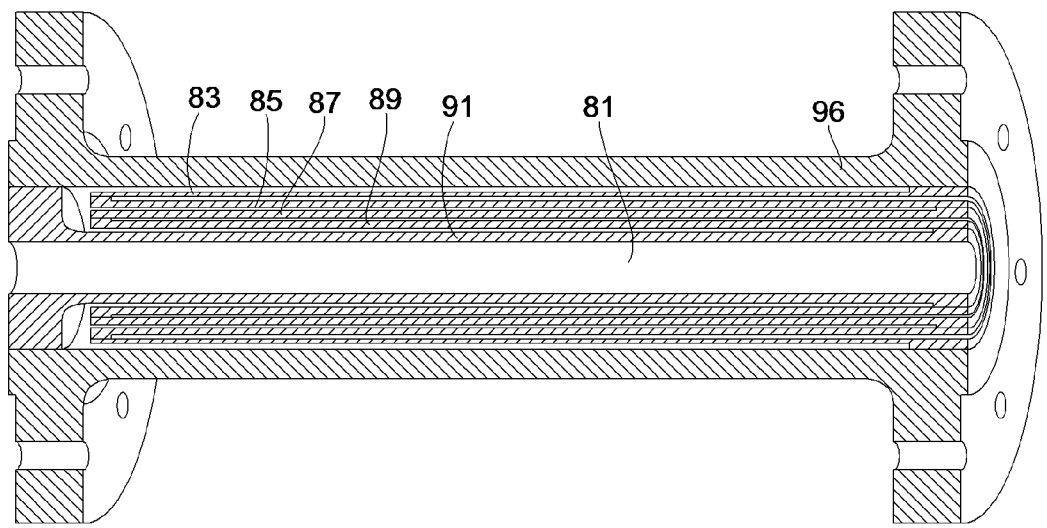
FIG. 16 is a cross sectional view of a fluid transfer conduit comprising five concentric tubes attached within a steam pipe according to an embodiment of the present invention.

FIG. 16 illustrates the steam pipe 96 employing a fluid transfer conduit 81 including five concentric tubes 83, 85, 87, 89, 91 according to a different embodiment of the present invention. In such embodiment, the steam pipe operation imparts compressive stress in the outermost tube 83, as it was with the outer tube 86 of the fluid transfer conduit 80 of FIG. 15. The subsequent tubes of the fluid transfer conduit 81 are subjected to tensile and compressive stress alternately, resulting in the innermost tube 91 in compressive stress. Such alternating stress pattern (e.g. compressive-tensile-compressive-tensile, etc.) in concentric layers of tubes is true for any number of tubes of a fluid transfer tube.

Figure 17:
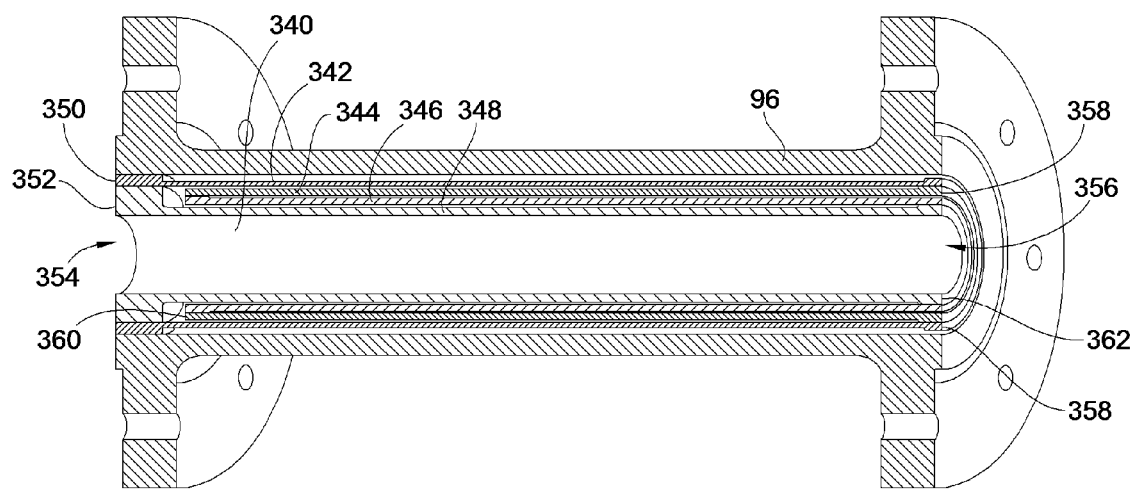
FIG. 17 is a cross sectional view of a fluid transfer conduit comprising four concentric tubes attached within a stream pipe according to an embodiment of the present invention.

FIG. 17 illustrates the steam pipe 96 employing a fluid transfer conduit 340 including four nested concentric tubes 342, 344, 346, 388 according to yet another embodiment of the present invention. In this embodiment, a first connector 350 is formed on the upstream end 354 of the first tube 342 and the second connector 352 is formed on the upstream end 356 of the fourth tube 348. As shown, the first connector 350 and the second connector 352 are located proximate each other, wherein the first connector 350 is attached to the inner surface of the steam pipe 96 and the second connector 352 is attached to the first connector 350. The downstream end 356 of the first tube 342 is joined with the downstream end 356 of the second tube 344, forming a first floating joint 358. The upstream end 354 of the second tube 344 is joined with the upstream end 354 of the third tube 346, forming a second floating joint 360. Similarly, the downstream end 356 of the third tube 346 and the downstream end 356 of the fourth tube 348 are joined, forming a third floating joint 362.

During operation, the fluid transfer conduit 340 becomes hotter than the pipe 96 due to hot steam flowing through the fluid transfer conduit 340. Since the innermost tube 348 is in a direct contact with hot steam, it typically becomes the hottest during operation, and the adjacent tubes 346, 344 and 342 are progressively cooler as they are located further out from hot steam and the innermost tube 348. A thermal stress is thus induced within the tubes 342, 344, 346, 348 due to their temperature differential. A thermal growth of the innermost tube 348, which is the hottest among the four tubes 342, 344, 346, 348, is constrained by the coolest outermost tube 342, and therefore is subject to an axial compressive stress. Conversely, the coolest tube 342 is subject to an axial tensile stress. Therefore, the stress pattern within the concentric tubes is, from the innermost to the outermost tube, alternatingly compression and tension.

Figure 5:
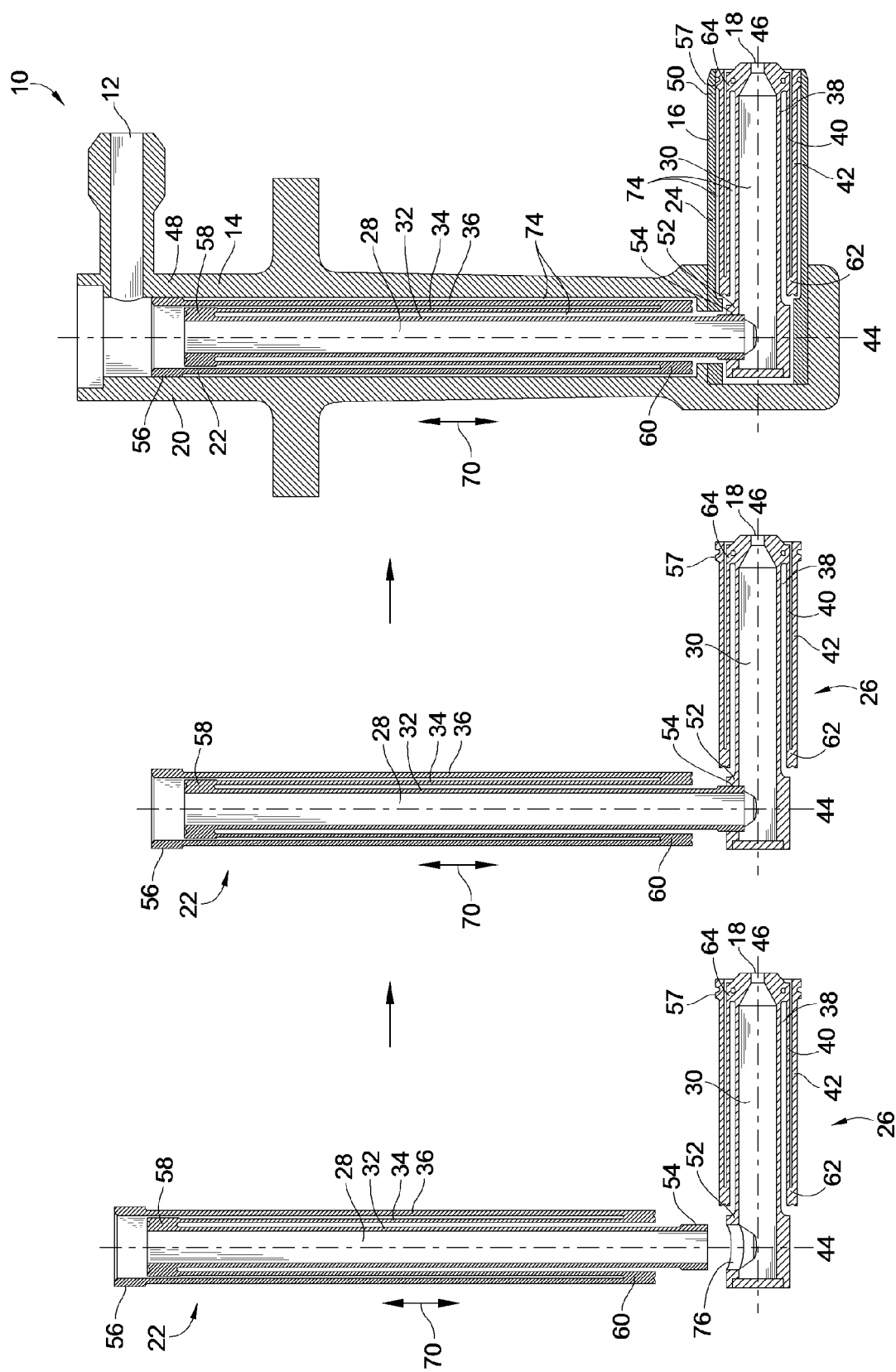
FIG. 5 is an illustration of a process of assembling the fuel nozzle of FIG. 1 according to an embodiment of the present invention.

FIG. 5 illustrates a process of assembling the fuel nozzle 10 of FIG. 1 according to an embodiment of the present invention. According to this embodiment, two fuel transfer conduits 22 and 26, each including three layers of concentric tubes, are formed and assembled together. As discussed previously, one end of the inner tube 32 of the fuel transfer conduit 22 is joined with the middle tube 34 at the joint 58 near inlet side connector 56. The other end of the inner tube 32 forms the connector 54. Similarly, one end of the inner tube 38 of the fuel transfer conduit 26 is joined with the middle tube 40 near fuel nozzle outlet 18. On the other end of the inner tube 38, an aperture 76 is formed. During the assembly process of the fuel transfer conduit 22 with the fuel transfer conduit 26, the fuel transfer conduit 26 is inserted horizontally into the nozzle head structure 24 from the downstream end. The fuel transfer conduit 22 is inserted into the support 14 from the upstream end vertically to the fuel transfer conduit 26. The connector 54 of the transfer conduit 22 is inserted into the aperture 76 of the fuel transfer conduit 26, wherein the connector 54 and an inner surface of the aperture 76 are permanently attached by a suitable process such as brazing or welding.

In the nozzle support structures 20, 24, the inlet side connector 56 of the outer tube 36 of the fuel transfer conduit 22 is permanently attached to an inner surface of the inlet side of the stem support structure 48 and the outlet side connector 57 of the outer tube 42 of the fuel transfer conduit 26 is permanently attached to an inner surface of the outlet side of the nozzle head support structure 50 by a suitable process such as welding or brazing. Preferably, inlet side connector 56 and the outlet side connector 57 are attached to the support structures 20, 24 via a vacuum brazing process. When the fuel transfer conduits 22, 26 are vacuum brazed to the support structures 20, 26 in a vacuum braze furnace, an air tight vacuum cavity 74 is formed. As shown, a space between the nozzle stem support structure 20 and the outer tube 36, a space between the middle tube 34 and the inner tube 32, a space between the nozzle head structure 24 and the outer tube 42, and a space between the middle tube 40 and the inner tube 38 are interconnected to form the one continuous vacuum cavity 74. That is, the cavity 74 remains in a vacuum state after the completion of the brazing process.

A fluid transfer conduit including a plurality of concentric tubes according to embodiments of the present invention has several advantages over conventional fluid transfer tubes. First, it has a superior ability to undergo large thermally induced deformations or other compression and expansion forces through a plurality of concentric tubes, as discussed above. Second, it has a superior insulation property to reduce the amount of heat transfer between fluid and the surrounding environment.

The improved thermal insulation property of the fluid transfer conduits of the present invention is partially provided by a vacuum cavity. A vacuum has a minimal to no capacity to transmit energy via thermal conduction. Therefore, a vacuum insulation, as provided by the vacuum cavity, can better insulate fluid from an outside environment than conventional insulations, such as air-fuel-coke mixtures. In addition, the plurality of concentric tubes also acts as radiation shields for fluid.

Therefore, implementing a fuel transfer conduit including a plurality of concentric tubes in hot or thermally harsh environments, such as gas turbine engine applications, can be advantageous. In such applications, the plurality of telescoping tubes of the fluid transfer conduit spreads thermal stresses imparted on the fluid transfer conduit from the high temperature surrounding environment among the plurality of the tubes to reduce the overall structural stress induced in the fluid transfer conduit. For example and as discussed above, a fluid transfer conduit including three layers of concentric tubes subjected to a high temperature surrounding environment will experience tensile stresses in the outer and inner tubes and compressive stress in the middle stress, wherein the structural stress induced in the fluid transfer conduit is divided and induced in each of the three tubes. Such alternating stress pattern (tensile-compressive-tensile- . . . ) induced in the tubes of the fluid transfer conduit is also true in a fluid transfer conduit including two concentric tubes or more than three concentric tubes.

Further, the fluid transfer conduit formed of a plurality of concentric tubes acts to insulate fluid, such as fuel flowing through the fuel transfer conduit of a fuel nozzle, from the severe surrounding environment by minimizing heat transfer through the vacuum cavity and shielding radiation through the plurality of tubes. The vacuum insulation via a vacuum cavity is feasible due to reduced total thermal structural stress induced in the fluid transfer conduit by spreading the stress into the plurality of concentric tubes.

Figure 6:
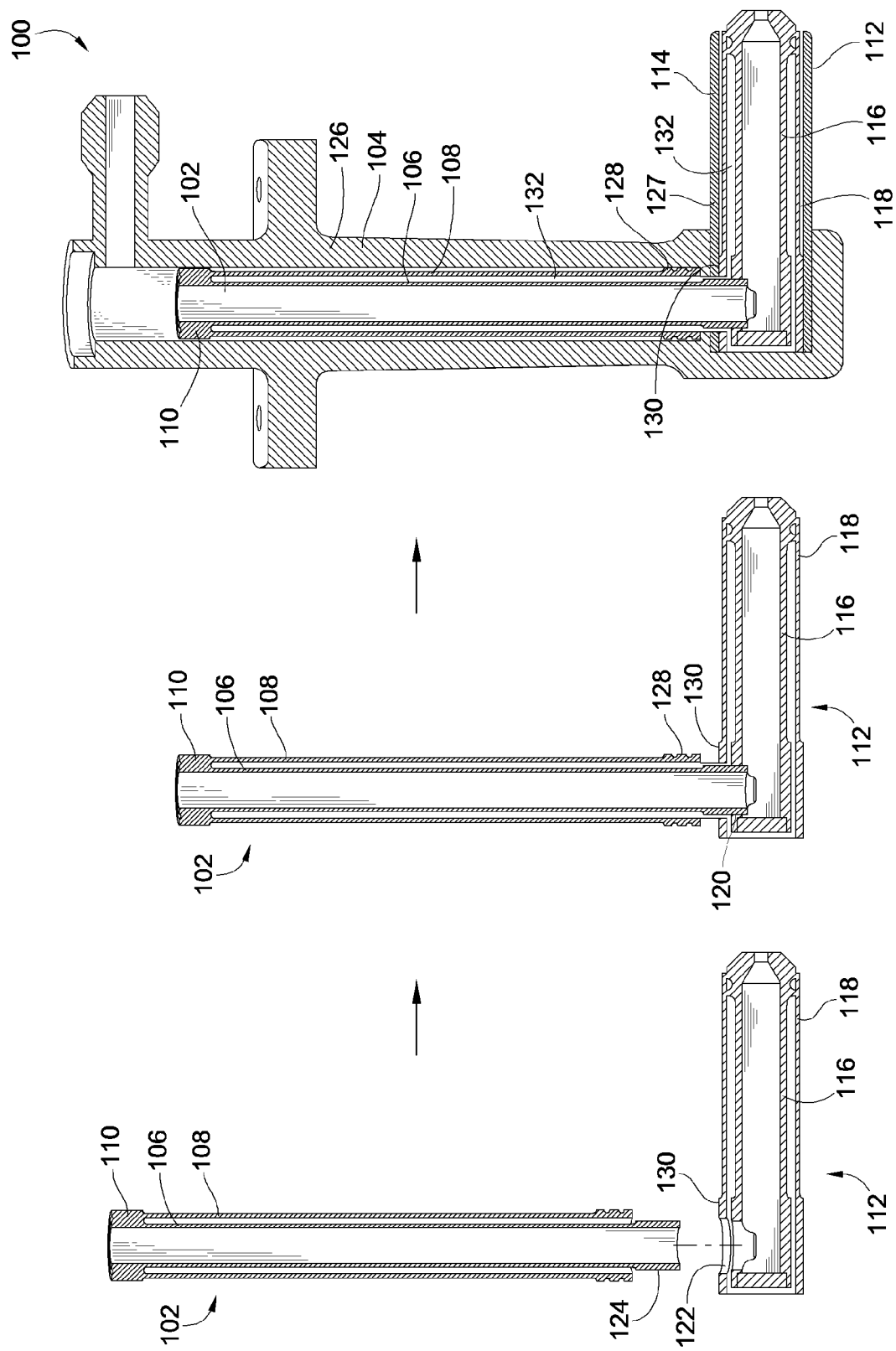
FIG. 6 is a cross sectional view of a fuel nozzle comprising two fuel transfer conduits, each including two concentric tubes according to an embodiment of the present invention.

FIG. 6 illustrates a fuel nozzle 100 including two fuel transfer conduits 102, 112 according to a different embodiment of the present invention. As shown, the fuel nozzle 100 is assembled similar to the fuel nozzle 10 of FIG. 5. As it was with the embodiment of FIG. 5, a fuel transfer conduit 102 for a nozzle stem 104 is formed. The fuel transfer conduit 102 includes an inner tube 106 and an outer tube 108, wherein the tubes 106, 108 are joined at a joint 110. The joint 110 is a floating joint, not attached to the support structure 126. Similarly, a fuel transfer conduit 112 for a nozzle tip 114 is formed, including an inner tube 116 and an outer tube 118. After being placed in the nozzle support structures 126 and 127, the fuel transfer conduit 102 is assembled with the fuel transfer conduit 112 by positioning a connector 124 of the inner tube 106 in an aperture 122 formed in one side of the fuel transfer conduit 112, wherein the two fuel transfer conduits 102, 112 are attached by a brazing process or any other suitable processes. In the support structures 126, 127, a connector 128 of the outer tube 108 and a connector 130 of the outer tube 118 are attached to the nozzle support structures 126, 127 by a suitable process such as brazing. When the fuel transfer conduits 102, 112 are securely attached to the support structures 126, 127, for example, via a vacuum brazing process in a vacuum braze furnace, an air tight vacuum cavity 132 is formed between the tubes 106, 108, 116, 118. As discussed above, the tubes 106, 108, 116, 118 of the fuel transfer conduits 102, 112 and the vacuum cavity 132 insulates fuel from the severe surrounding environment.

Figure 7:
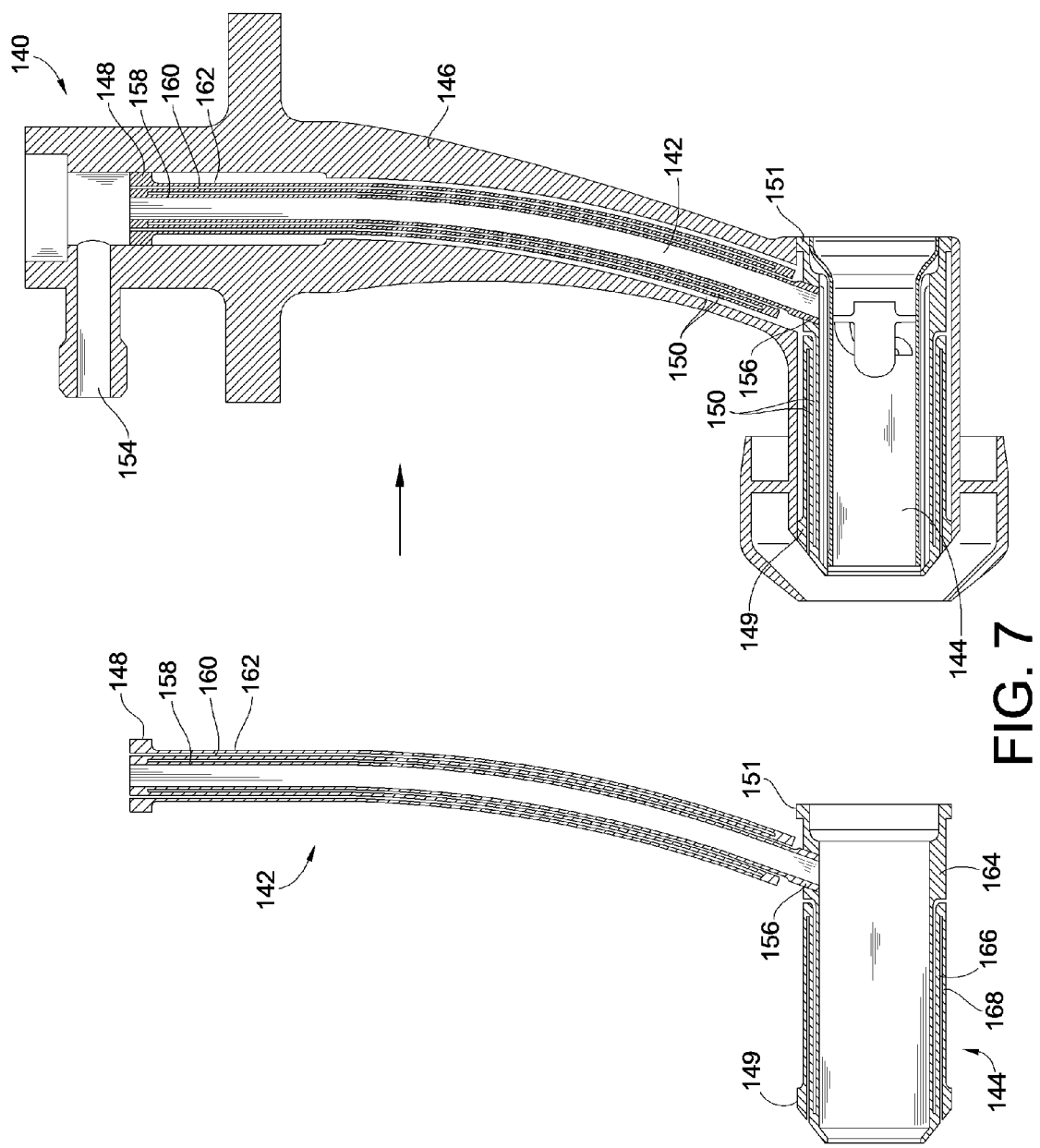
FIG. 7 is a cross sectional view of a curved fuel nozzle comprising two fuel transfer conduits according to another embodiment of the present invention.

FIG. 7 shows a fuel nozzle 140 including two fuel transfer conduits 142 and 144 according to an embodiment of the present invention. The fuel nozzle 140 is similar to the fuel nozzle 10 of FIGS. 1 and 5 in that each of the fuel transfer conduits 142, 144 includes three layers of concentric tubes. However, the fuel transfer conduit 142 in this embodiment is curved to fit a nozzle support structure 146, wherein a stem portion of the nozzle support structure 146 has a curved shape as shown. As it was with the fuel nozzle 10, the fuel transfer conduit 142 and the fuel transfer conduit 144 are attached at a connector 156 via a suitable process such as brazing or welding.

The fuel transfer conduit 142 includes an inner tube 158, a middle tube 160 and an outer tube 162. Similarly, the fuel transfer conduit 144 includes an inner tube 164, a middle tube 166 and an outer tube 168. The outer tube 162 include a connector 148, which is attached to an inner surface of the nozzle support structure 146 on a nozzle inlet side 154. The fuel transfer conduit 144 is attached to the nozzle support structure at connector 149 and connector 151. Preferably, the connectors 148, 149, 151 are attached to the nozzle support structure 146 via vacuum brazing, but other suitable processes may also be used. When the attachments are made by vacuum brazing, a vacuum cavity 150 is formed. The vacuum cavity 150 is defined by a space between the inner surface of the nozzle support structure 146 and the outer tube 162, a space between the middle tube 160 and the inner tube 158, a space between the inner surface of the support structure 146 and the outer tube 168 and a space between the middle tube 166 and the inner tube 164, wherein the spaces are interconnected to form one continuous vacuum cavity 150.

Figure 8:
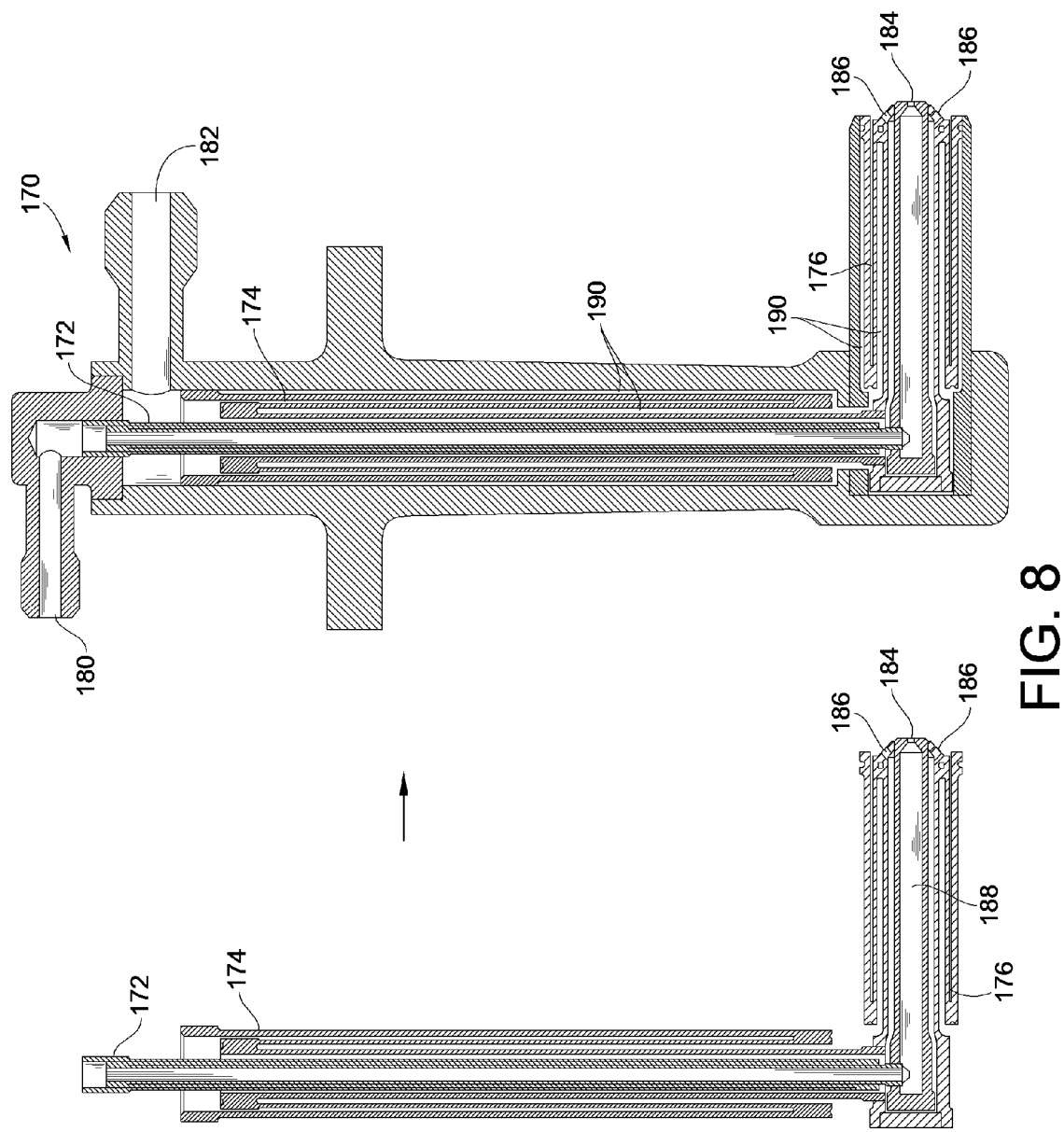
FIG. 8 is a cross sectional view of a fuel nozzle comprising three fuel transfer conduits, each fuel transfer conduit including three concentric tubes according to yet another embodiment of the present invention.

FIG. 8 shows a dual fuel circuit nozzle 170 including three fuel transfer conduits 172, 174, 176. The dual fuel circuit nozzle 170 is constructed similarly as the fuel nozzle 10 of FIGS. 1 and 5 in that each fuel transfer conduit includes three layers of concentric tubes. However, the dual fuel circuit nozzle 170 includes an additional fuel transfer conduit. In this embodiment, two different types or streams of fuel are transported through the fuel nozzle 170. A pilot fuel enters the fuel nozzle 170 through a pilot fuel inlet 180 and flows axially through the fuel transfer conduit 172 including three telescoping concentric tubes which is configured in a similar manner as previously described embodiments. The pilot fuel then flows radially through a fuel transfer tube 188 and exits through a pilot fuel outlet 184. Similarly, a main fuel enters the fuel nozzle 170 through a main fuel inlet 182 and flows axially through the fuel transfer conduit 174 including three telescoping concentric tubes. The main fuel then flows radially through the fuel transfer conduit 176 including three telescoping concentric tubes and exits through a main fuel outlet 186. As it was with previous embodiments, the fuel transfer conduits 172 and 174 are preferably attached to the nozzle support structures by vacuum brazing to form a vacuum cavity 190 to insulate the pilot fuel and main fuel from the surrounding environment. As shown, the fuel transfer tube 188 is a conventional single fluid tube, as additional thermal insulation may not be necessary since the pilot fuel is insulated by the vacuum cavity 190 and the tubes of the fuel transfer conduit 176. However, in other embodiments, a fuel transfer conduit including a plurality of tubes may be used in place of the conventional fuel transfer tube 188 to provide additional thermal insulation.

Figure 9:
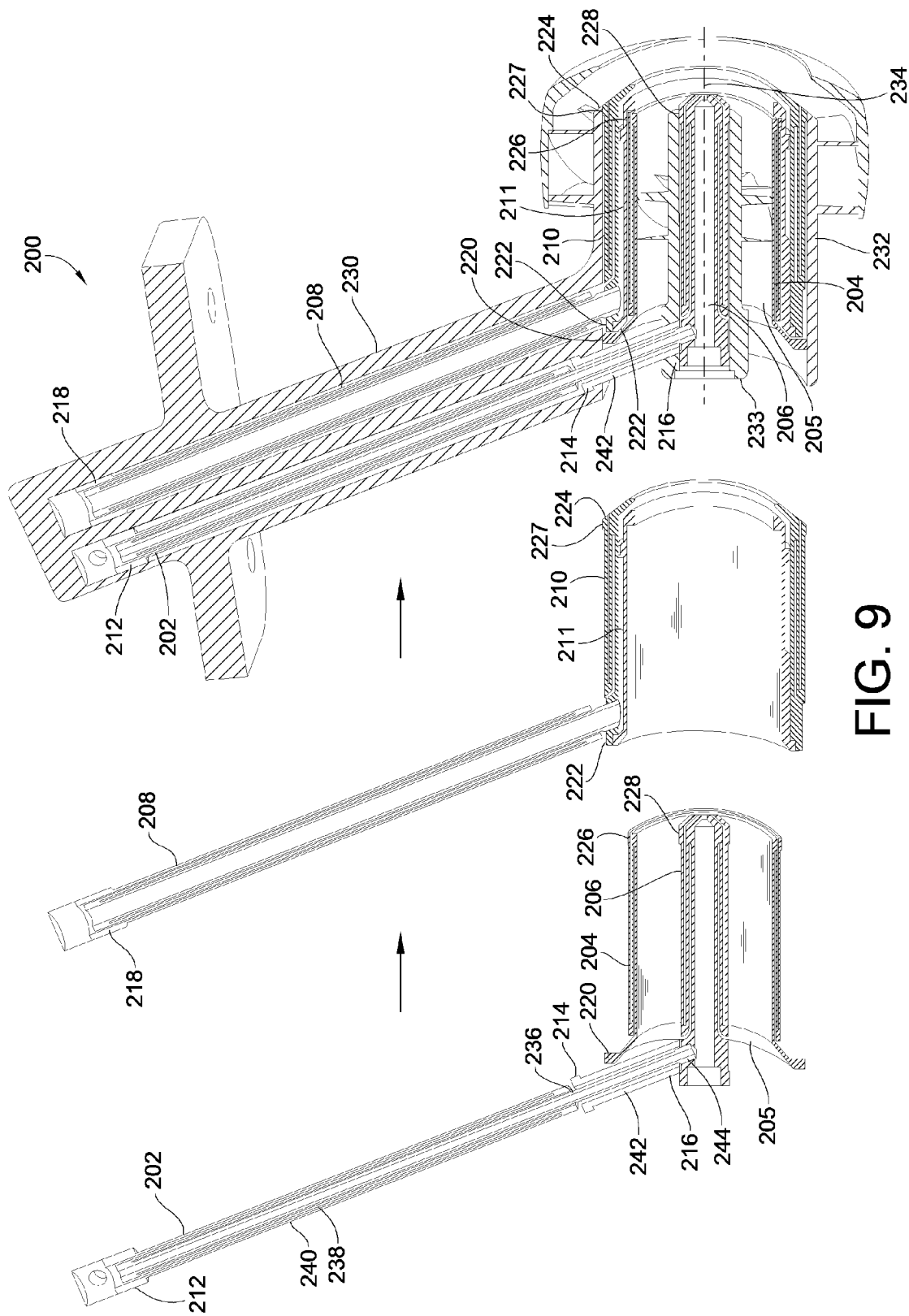
FIG. 9 is a cross sectional view of a fuel nozzle comprising five fuel transfer conduits and an airflow conduit according to an embodiment of the present invention.

FIG. 9 illustrates a fuel nozzle 200 including five fuel transfer conduits 202, 206, 208, 210, and 211 according to an embodiment of the present invention. In this embodiment, four of the five fuel transfer conduits 202, 206, 208, and 210 include three nested concentric tubes configured similarly as the fuel transfer conduits of previously described embodiments such as the fuel transfer conduit 22 of FIG. 1. The fifth fuel conduit 211 is constructed from a single tube. In addition, the fuel nozzle 200 includes an airflow conduit 204, which is also configured with three concentric nested tubes similar to the fuel transfer conduits 202, 206, 208, 210. As shown, the fuel transfer conduits 202 and 208 are located in a fuel nozzle stem structure 230, wherein the fuel transfer conduits 202 and 208 are positioned parallel to each other. The fuel transfer conduits 206, 210, 211, and the airflow conduit 204 are located in a fuel nozzle head structure 232. The fuel transfer conduits 206, 211, and 210, and the airflow conduit 204 are arranged concentrically about an axis 234, wherein the fuel transfer conduit 210 and 211 are the outermost conduits and the fuel transfer conduit 206 is the innermost conduit with the airflow conduit 204 positioned between them.

The fuel transfer conduit 202 and the fuel transfer conduit 206 are joined together, forming a first fuel flow path through them. The fuel transfer conduit 208 and the fuel transfer conduits 210 and 211 are joined together, forming a second fuel flow path through them. As such, the fuel nozzle 200 can transport two streams of fuel: a first fuel stream through the first fuel path and a second fuel stream through the second fuel path. As shown, an air path 205 is defined between the airflow conduit 204 and a fuel nozzle inner head structure 233, wherein a stream of hot air flows through. As configured, the airflow conduit 204 also functions as a heat shield to protect the second fuel stream from the hot airflow in path 205.

The fuel transfer conduit 202 is attached to the nozzle stem support structure 230 at connector 212. In this embodiment, an inner tube 236 of the fuel transfer conduit 202 is longer than a middle tube 238 and an outer tube 240. Thus, a cover tube 242 configured to fit the inner tube 236 is arranged concentrically over a portion of the inner tube 236 that extends beyond the middle tube 238 and the outer tube 240. The cover tube 242 is attached to the fuel nozzle stem structure 230 at a connector 214 and a fuel nozzle inner head structure 233 at a connector 216. The fuel transfer conduit 208 is attached to the fuel nozzle stem structure 230 at a connector 218. The fuel transfer conduit 206 is attached to the fuel nozzle inner head structure 234 at a connector 228. The airflow conduit 204 is attached to the fuel nozzle stem structure 230 at a connector 220 and to the fuel conduit 211 at a connector 226. The fuel transfer conduit 210 is attached to the fuel nozzle head structure 232 at a connector 227, and fuel conduits 208 and 211 at a connector 222. As it was with previous embodiments, the attachments of this embodiment are formed by vacuum brazing to form vacuum cavities to insulate fuel from the surrounding environment.

FIG. 18 illustrates a fuel nozzle 400 including four fuel transfer conduits 402, 406, 408, 410, and a multi-function conduit 404 according to a different embodiment of the present invention. The fuel nozzle 400 is similarly constructed as the fuel nozzle 200, except each of the fuel transfer conduits 406, 410, and the multi-function conduit 404, which are positioned in a fuel nozzle head structure 432 is configured with two concentric nested tubes. Further, the fuel transfer conduit 211, which was located between the fuel transfer conduit 210 and the airflow conduit 208 is omitted in this embodiment. As such, the multi-function conduit 404 is configured to define a portion of a fuel flow path and a portion of an airflow path.

As it was with the fuel nozzle 200, the fuel transfer conduit 402 and the fuel transfer conduit 406 are joined together, forming a first fuel flow path therein. Similarly, the fuel transfer conduit 408 and the fuel transfer conduits 404 and 410 are joined together, forming a second fuel flow path through them. As such, the fuel nozzle 402 is also configured to transport two streams of fuel through the first and second fuel flow paths.

An air path 405 is defined between the fuel transfer conduit 404 and a fuel nozzle inner head structure 433, wherein a stream of hot air flows through. As shown, inner tube 412 of the fuel transfer conduit 404 is attached to a fuel nozzle stem structure 432 at joint 418 via a suitable process such as brazing. The outer tube 414 of the fuel transfer conduit 404 is attached inner tube 424 of the fuel transfer conduit 410 at joint 428. As such, a vacuum cavity 422 is formed between the inner tube 412 and the outer tube 414 of the fuel transfer conduit 404, and between the inner tube 424 and the outer tube 426 of the fuel transfer conduit 410. As configured, the fuel transfer conduit 404 functions as a fuel transfer conduit, wherein the outer tube 414 attached to the inner tube 424 of the fuel transfer conduit 410 forms a part of the second fuel flow path, and the inner tube 412 defines the airflow path along with the nozzle head structure. The inner tube 412 of the fuel transfer conduit 404 also functions as a heat shield to protect the fuel stream flowing through the second fuel path from the hot air in airflow path 405.

Figure 10:
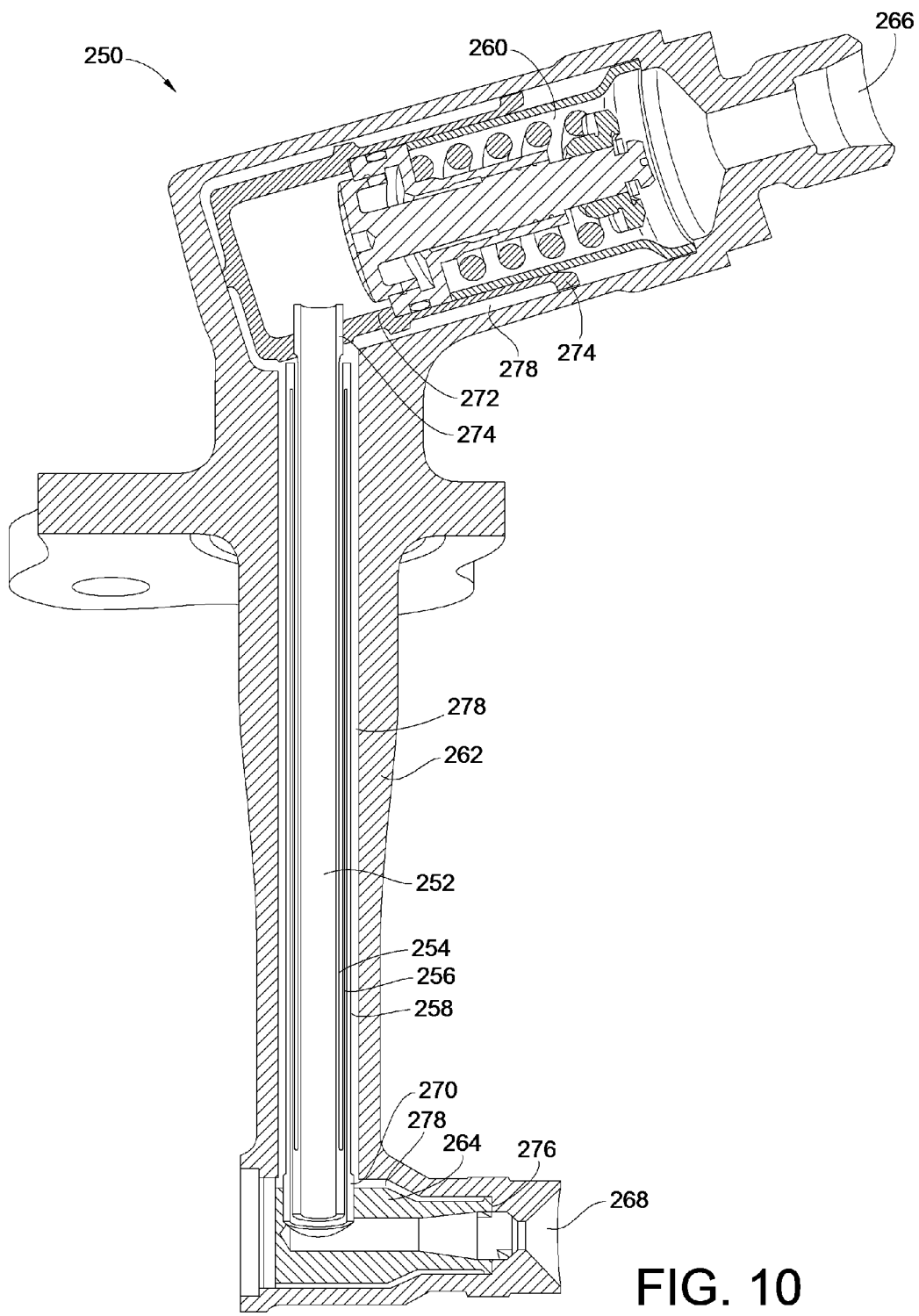
FIG. 10 is a cross sectional view of a metering valve fuel nozzle including a fuel transfer conduit comprising three concentric tubes according to a different embodiment of the present invention.

FIG. 10 shows a metering valve fuel nozzle 250 including a fuel transfer conduit 252 formed of three telescoping concentric tubes according to an embodiment of the present invention. The metering valve fuel nozzle 250 includes a metering valve 260, a fuel nozzle support structure 262, the fuel transfer conduit 252, and a fuel nozzle head tube 264. In this embodiment, fuel enters the metering valve fuel nozzle 250 through a fuel inlet 266 and flows through the metering valve 260, wherein the amount of fuel flow is controlled. Fuel then flows through the fuel transfer conduit 252 and the fuel nozzle head tube 264, and exits through a fuel outlet 268.

The fuel transfer conduit 252 includes an inner tube 254, a middle tube 256 and an outer tube 258. A down stream end of the fuel transfer conduit 252 is attached to the fuel nozzle head tube 264 at a connector 270. An upstream end of the fuel transfer conduit 252 is attached to a valve liner 272 at a connector 274 of the inner tube 254. The valve liner 272 is attached to the fuel nozzle support structure 262 at a connector 274 and the fuel nozzle head tube 264 is attached to the fuel nozzle support structure 262 at a connector 276. As it was with previously embodiment, the connectors 274 and 276 and the fuel nozzle support structure 262 are attached by a suitable process, preferably by vacuum brazing to form a vacuum cavity 278. The vacuum cavity 278 is defined by a space between the fuel nozzle support structure 262 and the valve line 272, a space between the fuel nozzle support structure 262 and the outer tube 258, a space between the middle tube 256 and the inner tube 254 and a space between the fuel nozzle support structure 262 and the fuel nozzle head tube 264, wherein the spaces are interconnected. As discussed previously, the three concentric tubes of the fuel transfer conduit 252 extend or shorten in telescoping manner as alternating tensile and compressive stresses are induced in the tubes when subjected to temperature changes. Such expansion or compression of the fuel transfer conduit 252 can better accommodate thermal expansion. Further, the fuel transfer conduit 252 including three concentric tubes provides improved thermal insulation through the vacuum cavity 278 and radiation shielding enabled by the plurality of tubes arranged between fuel and the surrounding environment.

Figure 11:
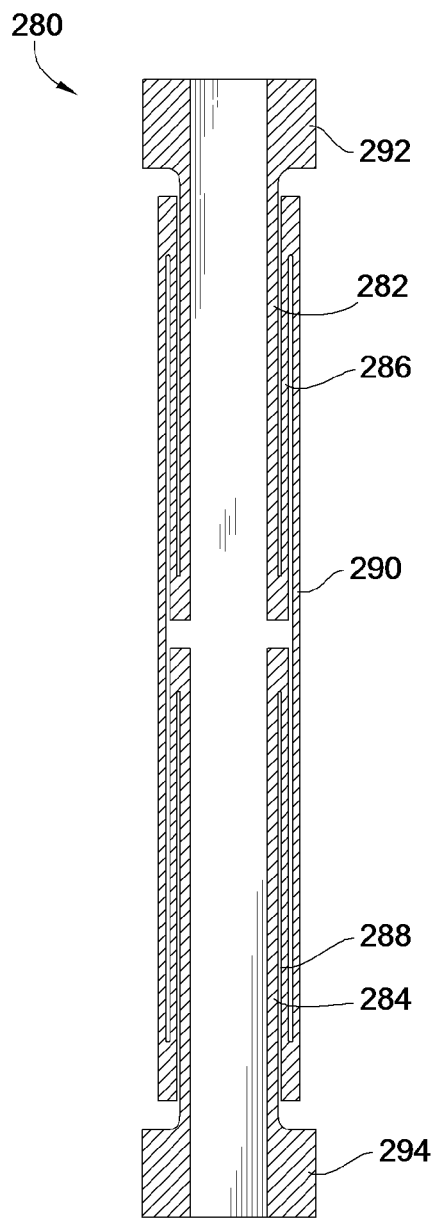
FIG. 11 is a cross sectional view of a variation of the fluid transfer conduit of FIG. 4, wherein the middle tube and the inner tube are divided in the middle to form two middle tubes and two inner tubes.
Figure 12:
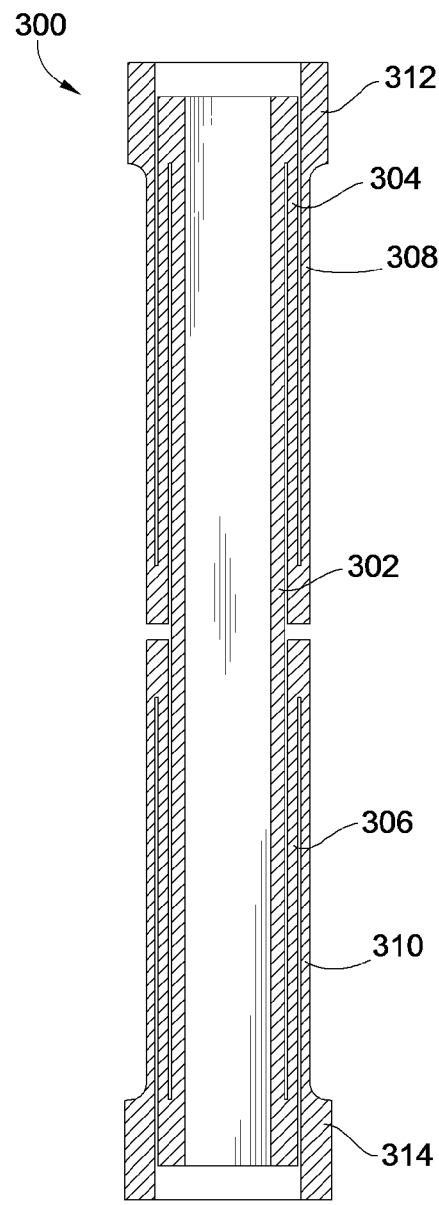
FIG. 12 is a cross sectional view of a different variation of the fluid transfer conduit of FIG. 4, wherein the middle tube and the outer tube are divided in the middle to form two middle tubes and two outer tubes.

Referring to FIGS. 11 and 12, variations of a fluid transfer conduit including a plurality of concentric tubes are shown. FIG. 11 shows a fluid transfer conduit 280 including two inner tubes 282, 284, two middle tubes 286, 288 and a outer tube 290. The fluid transfer conduit 280 is similar to the fluid transfer conduit 80 of FIG. 4, but the inner tube 82 and the middle tube 84 are divided in the middle to form two inner tubes 282, 284 and the two middle tubes 286, 288. Further, connectors 292, 294 of the fluid transfer conduit 280 are both formed on the inner tubes 282, 284, whereas the connectors 88, 90 of the fluid transfer conduit 80 are formed on opposite ends of the inner tube 82 and the outer tube 86.

Similarly, FIG. 12 shows another variation of the fluid transfer conduit 80 of FIG. 4 according to an embodiment of the present invention. A fluid transfer conduit 300 of this embodiment includes an inner tube 302, two middle tubes 304, 306 and two outer tubes 308, 310. Further, connectors 312 and 314 of the fluid transfer conduit 300 are both formed on the outer tubes 308, 310.

Figure 13:
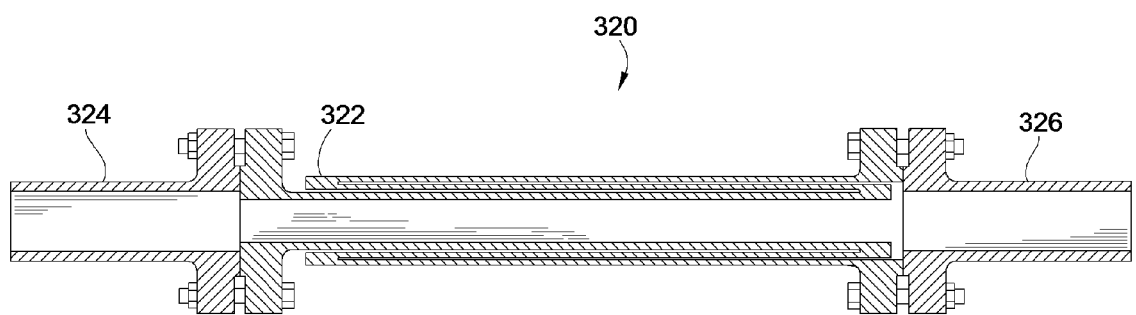
FIG. 13 is a cross sectional view of a pipe joint assembly comprising a fluid transfer conduit having three concentric tubes according to an embodiment of the present invention.
Figure 14:
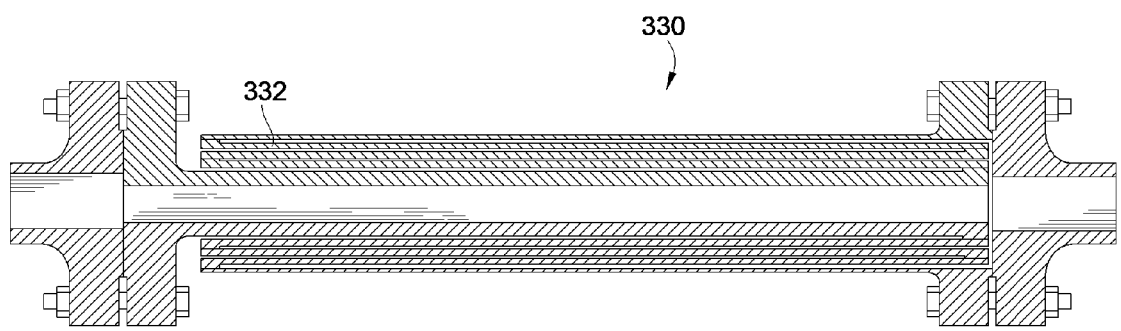
FIG. 14 is a cross sectional view of a pipe joint assembly comprising a fluid transfer conduit having five concentric tubes according to a different embodiment of the present invention.

FIG. 13 shows a pipe joint assembly 320 including a fluid transfer conduit 322 having three concentric tubes according to an embodiment of the present invention. In this embodiment, the fluid transfer conduit 322 is used as a flexible joint/damper between hard segments to accommodate thermally induced expansion and contraction in fluid transfer systems. As shown, a pipe 324 and a pipe 326 which are attached to fixtures (not shown) are joined by the fluid transfer conduit 322. As such, any thermally induced expansion and contraction on the pipes 324, 326 are accommodated by the fluid transfer conduit 322, wherein the transfer conduit 322 extends or compresses in a telescoping manner as described above. FIG. 14 depicts a pipe joint assembly 330 including a fluid transfer conduit 332, which includes five concentric tubes according to a different embodiment of the present invention.

The terms "upstream end", "downstream end", "inlet" and "outlet" are used to indicate and distinguish the location of features such as connectors and tube ends in this application. They do not necessarily align with the direction of fluid flow in the apparatus.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid transfer conduit, comprising:
a plurality of concentric tubes nested about an axis the plurality of concentric tubes comprising three concentric tubes;
each of the plurality of concentric tubes having an upstream end and a downstream end; and
each of the plurality of concentric tubes joined with an adjacent concentric tube at one of the upstream or downstream ends, wherein a fluid passageway is formed.

2. The fluid transfer conduit of claim 1, further comprising a first connector formed on one end of one of the plurality of concentric tubes and a second connector formed on one end of another concentric tube, wherein the plurality of the concentric tubes is configured to distribute an external load applied on the first connector and the second connector to each of the concentric tubes, wherein each of the concentric tubes is subjected to a tensile stress or a compressive stress in an alternating manner.

3. The fluid transfer conduit of claim 2, wherein the inlet connector and the outlet connector are attached to a support structure of a fluid transfer system, wherein the inlet connector and the outlet connector are attached to the support structure in an air tight manner to form a vacuum cavity between the support structure and the plurality of tubes; the vacuum cavity thermally insulating a fluid in the fluid passageway from a surrounding environment.

4. The fluid transfer conduit of claim 2, wherein the plurality of concentric tubes comprises an inner tube, a middle tube and an outer tube, wherein the upstream end of the inner tube is joined with the upstream end of the middle tube at a first joint, and the downstream end of the middle tube is joined with the downstream end of the outer tube at a second joint, wherein the first and second joints are floating joints; the inlet connector formed on the upstream end of the outer tube and the outlet connector formed on the downstream end of the inner tube.

5. The fluid transfer conduit of claim 4, wherein the inlet connector and the outlet connector are pulled apart from each other by an external load; the plurality of concentric tubes configured to distribute a stress from the external load to the inner tube, the middle tube and the outer tube.

6. The fluid transfer conduit of claim 5, wherein the outer tube expands, the middle tube compresses and the inner tube expands such that the plurality of concentric tubes extends, wherein the outer tube and the inner tube slide in a telescoping like manner, while the middle tube compresses, wherein the stress from the external load applied on the inlet connector and the outlet connector is divided and distributed to the outer tube, the middle tube and the inner tube.

7. The fluid transfer conduit of claim 4, wherein the inlet connector and the outlet connector are pushed toward each other by an external load; the plurality of concentric tubes configured to distribute a stress from the external load to the inner tube, middle tube, and the outer tube.

8. The fluid transfer conduit of claim 7, wherein the outer tube compresses, the middle tube expands and the inner tube compresses such that the plurality of concentric tubes compresses, wherein the outer tube and the inner tube slide in a telescoping like manner, while the middle tube expands, wherein the stress from the external load applied on the inlet connector and the outlet connector is divided and distributed to the outer tube, the middle tube and the inner tube.

9. The fluid transfer conduit of claim 2, wherein the plurality of concentric tubes comprises four concentric tubes including a first tube, a second tube, a third tube and a fourth tube; wherein the first connector is formed on the upstream end of the first tube and the second connector is formed on the upstream end of the fourth tube; wherein the downstream end of the first tube is joined with the downstream end of the second tube at a first joint, and the upstream end of the second tube and the upstream end of the third tube joined at a second joint, and the downstream end of the third tube and the downstream end of the fourth tube is joined at a third joint; wherein the first joint, the second joint and the third joint are floating joints; wherein the first connector is attached to a support structure and the second connector is attached to the first connector.

10. The fluid transfer conduit of claim 1, wherein the plurality of concentric tubes comprises five concentric tubes, wherein the plurality of concentric tube is configured to accommodate an axial tensile stress induced in the fluid transfer conduit by dividing and distributing the axial tensile stress to the five concentric tubes, wherein an axial tensile stress is induced in an outermost tube, a center tube and an innermost tube, and thus expanding these tubes, and an axial compressive stress is induced in tubes arranged between the outermost tube and the center tube, and the innermost tube and the center tube, and thus compressing theses tubes; the tubes subjected the axial tensile stress sliding in a telescoping like manner, while the tubes subjected to the axial compressive stress compress, thereby extending the plurality of concentric tubes, wherein each of the five tubes expands and compresses alternatingly.

11. The fluid transfer conduit of claim 1, wherein the fluid transfer conduit comprises five concentric tubes, wherein the fluid transfer conduit is configured to accommodate an axial compressive stress induced in the fluid transfer conduit by dividing and distributing the axial compressive stress to the five concentric tubes, wherein an axial compressive stress is induced in an outermost tube, a center tube and an innermost tube, and thus compressing these tubes, and an axial tensile stress is induced in tubes arranged between the outermost tube and the center tube, and the innermost tube and the center tube, and thus expanding these tubes, the tubes subjected the axial tensile stress sliding in a telescoping like manner, while the tubes subjected to the axial compressive stress compress, thereby compressing the plurality of concentric tubes, wherein each of the five tubes compresses and expands alternatingly.

12. The fluid transfer conduit of claim 1, wherein at least one of the plurality of concentric tubes is formed of a material having a different thermal expansion coefficient than the other tubes.

13. The fluid transfer conduit of claim 1, wherein each of the plurality of concentric tubes has about same cross-sectional area, such that each to the plurality of the concentric tubes has about same stiffness for equal distribution of a stress from an external load applied on the plurality of concentric tubes, wherein a wall thickness of each of the plurality of the concentric tubes decreases from an innermost tube to an outermost tube.

14. A fuel nozzle, comprising:
    a fuel nozzle support having a nozzle stem structure and a nozzle head structure;
    a fuel transfer conduit including:
        a plurality of concentric tubes nested about an axis the plurality of concentric tubes comprising three concentric tubes;
        each of the plurality of concentric tubes having an upstream end and a downstream end;
        each of the plurality of concentric tubes joined with an adjacent concentric tube at one of the upstream or downstream ends, wherein a fluid passageway is formed; and
    wherein the fuel transfer conduit is arranged within the fuel nozzle support and attached to an inner surface of the fuel nozzle support.

15. The fuel nozzle of claim 14, wherein the fuel transfer conduit further comprises a first connector formed on one end of one of the plurality of concentric tubes and a second connector formed on one end of another concentric tube.

16. The fuel nozzle of claim 15, wherein the fluid transfer conduit is a fuel transfer conduit, the fuel transfer conduit arranged in the nozzle stem structure, wherein the first connector is attached to the inner surface of the nozzle stem structure and the second connector is attached to a fuel transfer tube arranged in the nozzle head structure; the fuel transfer tube including a third connector, the third connector attached to an inner surface of the nozzle head structure; wherein the first connector, the second connector and the third connector are attached by vacuum brazing to form a vacuum cavity between the plurality of concentric tubes and the nozzle stem structure, and the fuel transfer tube and the nozzle head structure; the vacuum cavity thermally insulating fuel from a surrounding environment.

17. The fuel nozzle of claim 15, wherein the fluid transfer conduit is configured to divide and distribute a stress from an external axial load applied on the fluid transfer conduit to each of the concentric tubes, wherein each of the concentric tubes expands or compresses in an alternating manner.

18. The fuel nozzle of claim 14, wherein the fuel nozzle includes a plurality of fluid transfer conduits, wherein a plurality of fluid passage ways are formed to transfer a plurality of fuel streams.

19. The fuel nozzle of claim 18, wherein at least one of the plurality of fluid transfer conduits is an air transfer conduit, wherein the air transfer conduit carrying a stream of air provides a heat shield for at least one of the plurality of fuel streams from an external environment having an elevated temperature or the stream of air flowing through the air transfer conduit.

20. The fuel nozzle of claim 18, wherein at least one of the plurality of fluid transfer conduits is a multi-function conduit, wherein the multi-function conduit defines a portion of a fuel flow path and a portion of an airflow path, wherein the multi-function conduit provides a heat shield for at least one of the plurality of fuel streams from an external environment or a stream of air flowing through the airflow path.

21. A pipe joint assembly comprising:
a first pipe;
a second pipe; and
a fluid transfer conduit joining the first pipe and the second pipe, the fluid transfer conduit including:
a plurality of concentric tubes nested about an axis the plurality of concentric tubes comprising three concentric tubes;
each of the plurality of concentric tubes having an upstream end and a downstream end; and
each of the plurality of concentric tubes joined with an adjacent concentric tube at one of the upstream or downstream ends, wherein a fluid passageway is formed.

22. The pipe joint assembly of claim 21, wherein the fluid transfer conduit is configured to divide and distribute an axial stress induced in the pipe joint assembly to each of the concentric tubes, wherein each of the concentric tubes are subjected to alternating tensile stress and compressive stress.

23. The pipe joint assembly of claim 22, wherein the fluid transfer conduit comprises fluid transfer conduit comprises three concentric tubes are configured to divide and distribute a thermal expansion stress induced in the pipe joint assembly; wherein an outer tube and an inner tube are subjected to a tensile stress and expand, whereas a middle tube is subjected to a compressive stress and compresses; wherein the outer tube and the inner tube slide in a telescoping like manner, while the middle tube compresses, thereby extending the fluid transfer conduit to accommodate the thermal expansion stress induced in the pipe joint assembly.

24. The pipe joint assembly of claim 22, wherein the three concentric tubes are configured to divide and distribute a thermal compression stress induced in the pipe joint assembly, wherein an outer tube and an inner tube are subjected to a compressive stress and compress; whereas a middle tube is subjected to a tensile stress to and expands; thereby compressing the fluid transfer tube to accommodate the thermal compression stress induced in the pipe joint assembly.

25. The pipe joint assembly of claim 22, wherein the fluid transfer conduit comprises five concentric tubes configured to divide and distribute a thermally induced axial stress, wherein each of the concentric tubes are subjected to alternating tensile stress and compressive stress.

26. A method of reducing an axial stress induced on a fluid transfer conduit comprising:
forming a fuel transfer conduit including:
a plurality of concentric tubes nested about an axis the plurality of concentric tubes comprising three concentric tubes;
each of the plurality of concentric tubes having an upstream end and a downstream end; and
each of the plurality of concentric tubes joined with an adjacent concentric tube at one of the upstream or downstream ends, wherein a fluid passageway is formed;
a first connector formed on the upstream end of one of the plurality of concentric tubes and a second connector formed on the downstream end of one of the plurality of concentric tubes; and
joining the fluid transfer conduit to a fluid transfer system, wherein the first connector and the second connector are attached to a structural support of the fluid transfer system.

27. The method of claim 26, wherein the fluid transfer conduit is configured to divide and distribute an axial stress induced in the fluid transfer conduit, wherein each of the concentric tubes are subjected to alternating tensile stress and compressive stress, thereby expanding and compressing alternatingly.

28. A method of improving thermal insulation of a fluid transfer system comprising:
forming a fuel transfer conduit including:
a plurality of concentric tubes nested about an axis the plurality of concentric tubes comprising three concentric tubes;
each of the plurality of concentric tubes having an upstream end and a downstream end; and
each of the plurality of concentric tubes joined with an adjacent concentric tube at one of the upstream or downstream ends, wherein a fluid passageway is formed;
a first connector formed on the upstream end of one of the plurality of concentric tubes and a second connector formed on the downstream end of one of the plurality of concentric tubes;
arranging the fluid transfer conduit within the fluid transfer system, wherein the first connector and the second connector are attached to a structural of the fluid transfer system; and
forming a vacuum cavity between the plurality of concentric tubes and an inner surface of the fluid transfer system, wherein the vacuum cavity providing thermal insulation between a fluid in the fluid transfer conduit and an environment external to the fluid transfer system.

29. The method of claim 28, wherein the vacuum cavity is formed when the first connector and the second connector are attached using a vacuum brazing or welding process.

* * * * *